United States Patent [19]
Hayashi et al.

[11] Patent Number: 5,784,356
[45] Date of Patent: Jul. 21, 1998

[54] OPTICAL DISK REPRODUCING APPARATUS EQUIPPED WITH VARIABLE GAIN AMPLIFIER CAPABLE OF ADJUSTING AMPLITUDE OF REPRODUCTION SIGNAL

[75] Inventors: Yasuhiro Hayashi, Yokohama; Hiroshi Shimada, Tokyo, both of Japan

[73] Assignee: Kabushiki Kaisha Toshiba, Kawasaki, Japan

[21] Appl. No.: 736,407

[22] Filed: Oct. 24, 1996

[30] Foreign Application Priority Data

Oct. 27, 1995 [JP] Japan ................................. 7-280767

[51] Int. Cl.⁶ .................................................. G11B 7/00
[52] U.S. Cl. ............................................ 369/124; 369/48
[58] Field of Search ................................ 360/25, 27, 46, 360/67; 369/47, 48, 53, 54, 124, 134

[56] References Cited

U.S. PATENT DOCUMENTS

| | | |
|---|---|---|
| 4,300,172 | 11/1981 | Sochor et al. . |
| 5,083,304 | 1/1992 | Cahill . |
| 5,132,988 | 7/1992 | Fisher et al. . |
| 5,297,184 | 3/1994 | Behrens et al. . |
| 5,422,601 | 6/1995 | Kovacs et al. . |
| 5,568,465 | 10/1996 | Hutchins et al. ............... 369/124 |

FOREIGN PATENT DOCUMENTS 0 402 115  12/1990  European Pat. Off. .

OTHER PUBLICATIONS

Patent Abstracts of Japan, vol. 11, No. 40 (P–544), Feb. 5, 1987, JP–61–208634, Sep. 17, 1986.

*Primary Examiner*—Paul W. Huber
*Attorney, Agent, or Firm*—Oblon, Spivak, McClelland, Maier & Neustadt, P.C.

[57] ABSTRACT

An apparatus for an optical disk reproducing apparatus is disclosed, which allows positive counter-measures against data read errors without depending on only an operation of decreasing the reproduction speed, thus positively maintaining high speed reproduction. This system incorporates an error rate counter for monitoring error flags which can be detected in error correction processing, and a variable gain amplifier for adjusting the amplitude of an RF signal. A system controller constantly monitors error count data to determine the error rate of a disk in the reproduction mode from moment to moment. When the error rate exceeds a certain level at each reproduction speed, the amplitude of an RF signal from the variable gain amplifier is increased to set the error rate to a level at which data can be properly read.

14 Claims, 10 Drawing Sheets

OPTICAL DISK REPRODUCING APPARATUS EQUIPPED WITH VARIABLE GAIN AMPLIFIER CAPABLE OF ADJUSTING AMPLITUDE OF REPRODUCTION SIGNAL

BACKGROUND OF THE INVENTION

1. Field of the Invention

The present invention relates to an optical disk reproducing apparatus applied to a data signal amplitude control mechanism in an optical disk system.

2. Description of the Related Art

Figure 1:
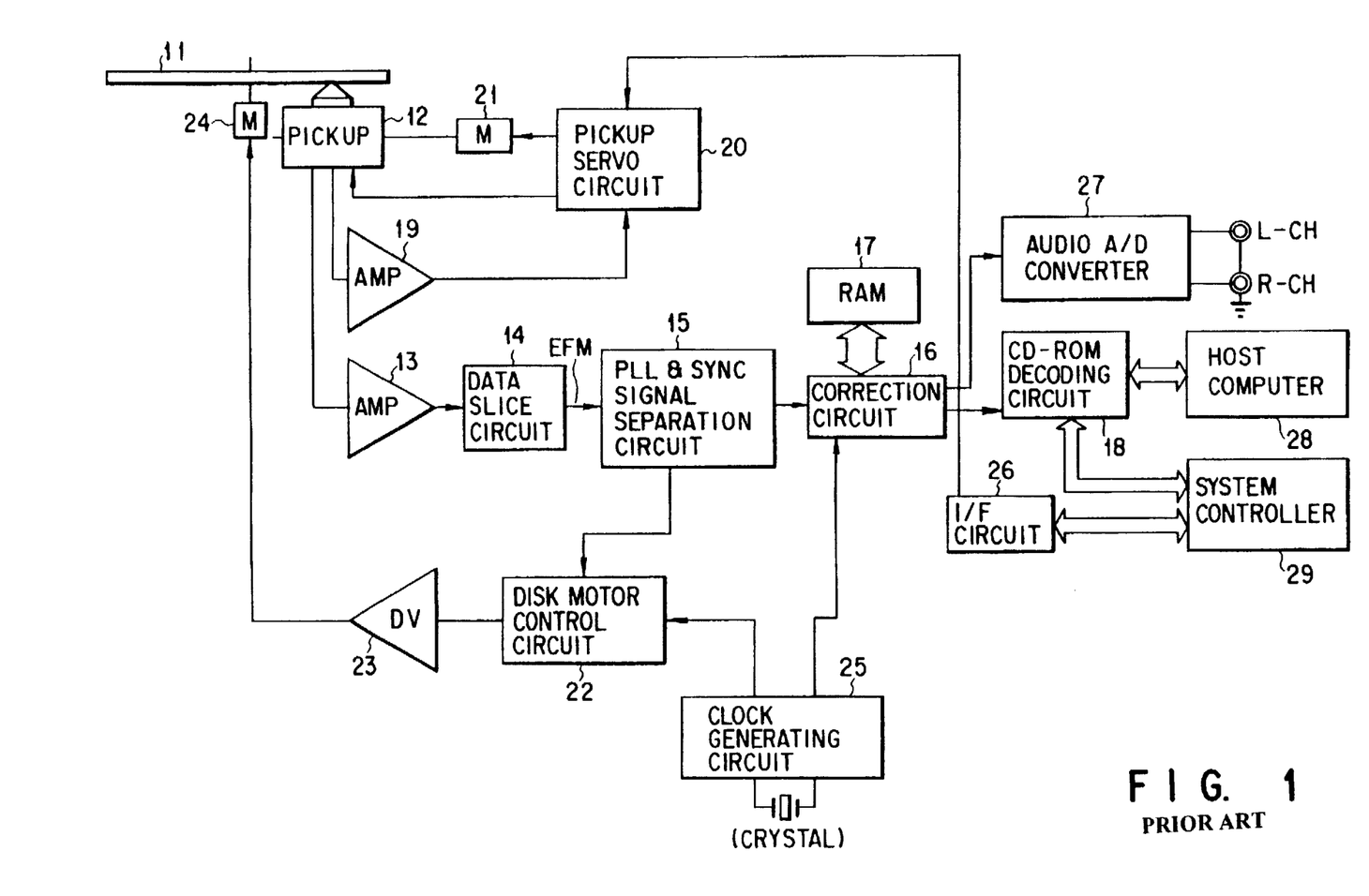
FIG. 1 is a first block diagram showing a CD-ROM system (reproducing mechanism) for a conventional optical disk reproducing apparatus.

FIG. 1 is a first block diagram showing a CD-ROM system (reproducing mechanism) for a conventional optical disk reproducing apparatus. A pickup 12 irradiates a laser beam onto a disk 11 and receives light reflected by the disk 11. A reproduction signal corresponding to the received light is subjected to waveform equalization in an amplifier 13 and formed into an RF signal. The RF signal is binarized into digital data by a data slice circuit 14. This signal will be referred to as an EFM signal. The EFM signal is input to a PLL (Phase Locked Loop) & sync signal separation circuit 15. The circuit 15 extracts a sync clock and a sync signal from the EFM signal, and thereafter generates a data signal. This data signal is sent to a correction circuit 16 and subjected to error correction processing by using a correction RAM 17.

While a disk on which data is recorded in the CD-ROM format is played, the system operates at double speed or more. The data signal corrected by the correction circuit 16 is sent to a CD-ROM decoding circuit 18. In this circuit 18, the data signal further undergoes correction and buffering. The resultant data is transferred to a host computer 28 outside the ROM drive mechanism at a high speed. While a disk on which a digital audio signal is recorded is played, data is sent to an audio A/D converter 27 to be reproduced at normal speed.

In order to match the operation of the system with the respective reproduction speeds, a sync signal extracted by the PLL & sync signal separation circuit 15 is sent to a disk motor control circuit 22. The disk motor control circuit 22 compares the above sync signal with a clock from a clock generating circuit 25 to generate a control signal for causing the disk to rotate. That is, this control signal is supplied to a disk motor 24 through a driver 23 to drive the disk motor 24 in accordance with the respective reproduction speeds.

A servo system signal read by the pickup 12 is sent to a pickup servo circuit 20 through an amplifier 19. The pickup servo circuit 20 performs equalization processing of the signal, and then drives the actuator of the pickup 12 and a pickup feed motor 21.

A system controller 29 is constituted by a microcomputer. The system controller 29 controls the CD-ROM decoding circuit 18, and also controls the pickup servo circuit 20 for a CD through an interface circuit (I/F circuit) 26 of the microcomputer (system controller 29).

Figure 2:
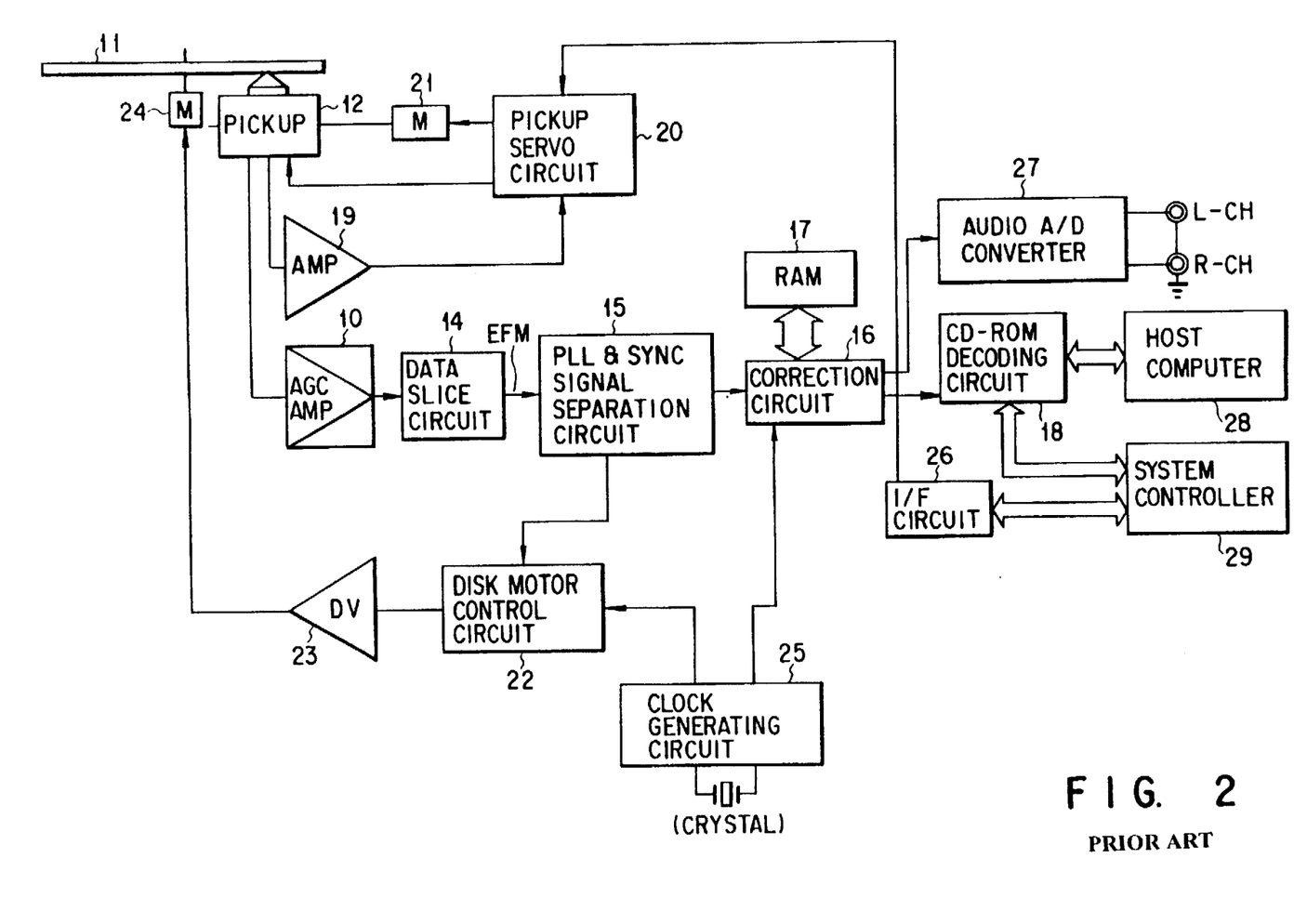
FIG. 2 is a second block diagram showing a CD-ROM system (reproducing mechanism) for a conventional optical disk reproducing apparatus.

FIG. 2 is a second block diagram showing a CD-ROM system (reproducing mechanism) for a conventional optical disk reproducing apparatus. Unlike the system shown in FIG. 1, an AGC (Automatic Gain Control) amplifier 10 is used for an RF signal processing system. Since the operation of this system is the same as that described with reference to FIG. 1, only a different portion will be described below. The AGC amplifier 10 incorporates an operation standard, and this standard value is fixed in each individual system in most cases. For this reason, in general, the AGC amplifier 10 operates such that the output RF signal always has a constant amplitude, even if the system operation speed or the disk is changed.

Since the CD system is essentially an audio reproducing system, a disk is rotated at normal speed. However, the transfer rate of this system is lower than that of a general computer storage medium. In addition, in consideration of recent reproduction processing of large-volume moving image data, it is important to increase the transfer rate of the CD system. Recently, it is taken for granted that the CD system has a double-speed reproduction mechanism. The reproduction speed is still increasing to quadruple speed, sextuple speed, and octuple speed. The competition to increase the transfer rate is becoming increasingly fierce.

However, the CD system is not essentially designed for such high-speed, high-rate transfer. For this reason, in the CD system, when a disk is rotated at a high speed, especially the quadruple speed or more, the quality of the signal reproduced from the disk deteriorates, resulting in an increase in error rate. As a result, the error rate exceeds a limit beyond which error correction cannot be performed. A cause for such a failure may be a band shortage in the RF signal processing system including the pickup. Owing to the band shortage, the bitter in an RF signal increases, and the error rate increases. As a result, the reproduced data signal becomes worthless, and the disk no longer functions as a CD-ROM. Such a problem greatly depends on the quality of the disk. That is, the degree of the problem varies among the commercially available CD-ROM disks.

It is better to read data from a CD-ROM at a low rotational disk speed than to read no data at all. Even a commercially available CD-ROM drive has a function of reading data by lowering the rotational (or reproduction) speed of a disk.

Assume that a countermeasure against the above problem depends on only the reproduction speed of a disk. That is, if data cannot be read at quadruple speed, the reproduction speed is decreased to double speed. If data cannot still be read, the reproduction speed is decreased to normal speed. In this case, as is apparent, the transfer rate steadily decreases, and the CD-drive designed for high-speed reproduction cannot exhibit its characteristics 100%.

As described above, in the prior art, decreasing the reproduction speed is the only countermeasure to be taken when it is determined that data cannot be properly read from a disk. Such a countermeasure cannot be regarded as a positive countermeasure for a CD-ROM drive designed for high-speed reproduction.

SUMMARY OF THE INVENTION

It is, therefore, an object of the present invention to provide an optical disk reproducing apparatus having countermeasures against a data read error which do not depend on only reproduction speeds.

In order to achieve the above object, according to the present invention, there is provided an optical disk reproducing apparatus having a system for demodulating a reproduction signal read by pickup means from a medium on which digital data is recorded, comprising a variable gain amplifier for amplifying an amplitude of the reproduction signal from the pickup means in accordance with a control signal, correction processing means for generating a data signal by binarizing an output signal from the variable gain amplifier, extracting a clock synchronous with the data signal, and performing demodulation and error correction processing of the data signal to generate a signal corresponding to the correction result, and system control means for adjusting a gain of the variable gain amplifier by obtaining the control signal in accordance with the signal corresponding to the correction result obtained by the correction processing means.

According to the present invention, the amplitude of the reproduction signal is adjusted by the variable gain amplifier in accordance with the correction result signal. That is, an increase in slew rate and a decrease in error rate can be attained by raising the signal amplitude level without changing the reproduction speed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

Figure 3:
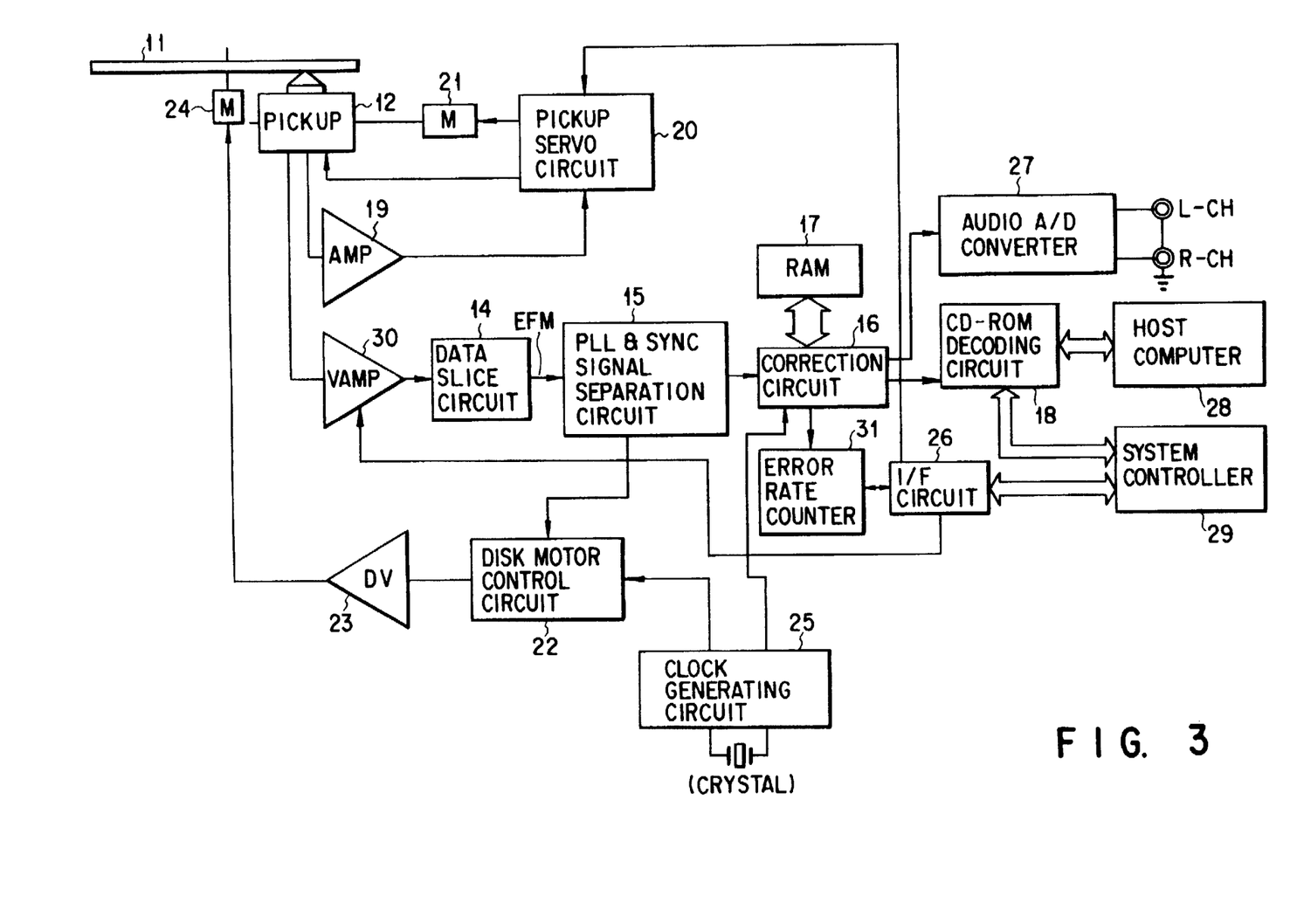
FIG. 3 is a block diagram showing a CD-ROM system (reproducing mechanism) for an optical disk reproducing apparatus according to the first embodiment of the present invention.

FIG. 3 is a block diagram showing a CD-ROM system (reproducing mechanism) for an optical disk reproducing apparatus according to the first embodiment of the present invention. A pickup 12 irradiates a laser beam onto a disk 11 and receives light reflected by the disk 11. A reproduction signal corresponding to the received light is subjected to waveform equalization in a variable gain amplifier 30 (to be described later) and formed into an RF signal. The RF signal is binarized into digital data by a data slice circuit 14. This signal will be referred to as an EFM signal. The EFM signal is input to a PLL (Phase Locked Loop) & sync signal separation circuit 15. The circuit 15 extracts a sync clock and a sync signal from the EFM signal, and thereafter generates a data signal. This data signal is sent to a correction circuit 16 and subjected to error correction processing by using a correction RAM 17.

In the CD system, in performing error correction processing, the correction circuit 16 performs C1 correction processing and C2 correction processing which is performed by using a C1 correction flag generated after the C1 correction processing. The C1 correction flag obtained after C1 correction processing is a flag indicating the error rate of input data from the PLL & sync signal separation circuit 15. The quality of the reproduction signal can be determined by actually monitoring this flag. A C2 correction flag (including a C2 correction disabled flag or a compensation flag) can be detected after C2 correction processing. This flag indicates the correction limit in this CD system. The limit of the quality of data read from a disk can be determined by monitoring this flag.

The present invention includes an error rate counter 31 to use the C1 correction flag and the compensation flag (or the C2 correction flag) described above. The error rate counter 31 cumulatively counts C1 correction flags or compensation flags (C2 correction flags) detected by the correction circuit 16 for a predetermined period of time. The count value of the error rate counter 31 is supplied to a system controller 29 through an interface circuit (I/F circuit) 26 of the microcomputer (system controller 29). The system controller 29 can determine the count state of the error rate counter 31. With this operation, the error rate quality of data input to the CD decoding system can be determined. More specifically, the error rate quality of a data signal input to a CD-ROM decoding circuit 18 can be determined.

As described above, the system controller 29 can monitor the result obtained by the error rate counter 31. With this operation, if, for example, the C1 correction flag count increases, and compensation flags are being counted, the system controller 29 performs control to increase the gain of the variable gain amplifier 30 through the I/F circuit 26, thus increasing the amplitude of the RF signal. As the amplitude of the RF signal increases, the S/N (signal-to-noise ratio) can be improved. As a result, gain control of the RF signal (reproduction signal) is performed so as not to generate any compensation flag. This operation allows the error level of the reproduction signal to fall within the range in which data can be satisfactorily read, without decreasing the reproduction speed.

When a disk on which data is recorded in the CD-ROM format is played, the system operates at a high speed equal to or higher than double speed. The data signal having passed through the correction circuit 16 is sent to the CD-ROM decoding circuit 18. In this circuit 18, an error in the above data signal which could not corrected by the correction circuit 16 are corrected on the basis of a compensation flag. After buffering, the data is transferred to a host computer 28 outside the ROM drive mechanism at a high speed. While a disk on which a digital audio signal is recorded is played, data is sent to an audio A/D converter 27, and the audio signal is reproduced at normal speed.

In order to match the operation of the system with the above reproduction speeds, a sync signal extracted by the PLL & sync signal separation circuit 15 is sent to a disk motor control circuit 22. The disk motor control circuit 22 compares the above sync signal with a clock from a clock generating circuit 25 to generate a control signal for causing the disk to rotate. This control signal is supplied to a disk motor 24 through a driver 23 to drive the disk motor 24 in accordance with the respective reproduction speeds.

A servo system signal read by the pickup 12 is sent to a pickup servo circuit 20 through an amplifier 19. The pickup servo circuit 20 performs equalization processing of the signal, and then drives the actuator of the pickup 12 and a pickup feed motor 21. The system controller 29 controls the CD-ROM decoding circuit 18, and also controls the pickup servo circuit 20 for a CD through an I/F circuit 26.

In the above arrangement, much attention is focused on the fact that the cause that disables the CD-ROM system to read data is often associated with the S/N or the reflectance of the disk. The slew rate of an RF signal, i.e., the error rate, can be increased by increasing the amplitude of the RF signal without changing the reproduction speed. The above arrangement positively uses this mechanism. Therefore, this system can sufficiently exhibit its characteristics as a CD-ROM drive for high-speed reproduction.

As another determination method for the error rate counter 31, a method which is dependent on only the count result of C1 correction flags may be used. When the count result of C1 correction flags indicates that the error rate of an RF signal falls outside the range in which data can be satisfactorily read, the gain of the variable gain amplifier 30 for amplifying the RF signal is increased to make the error data after C1 correction processing fall within the allowable range.

Figure 4:
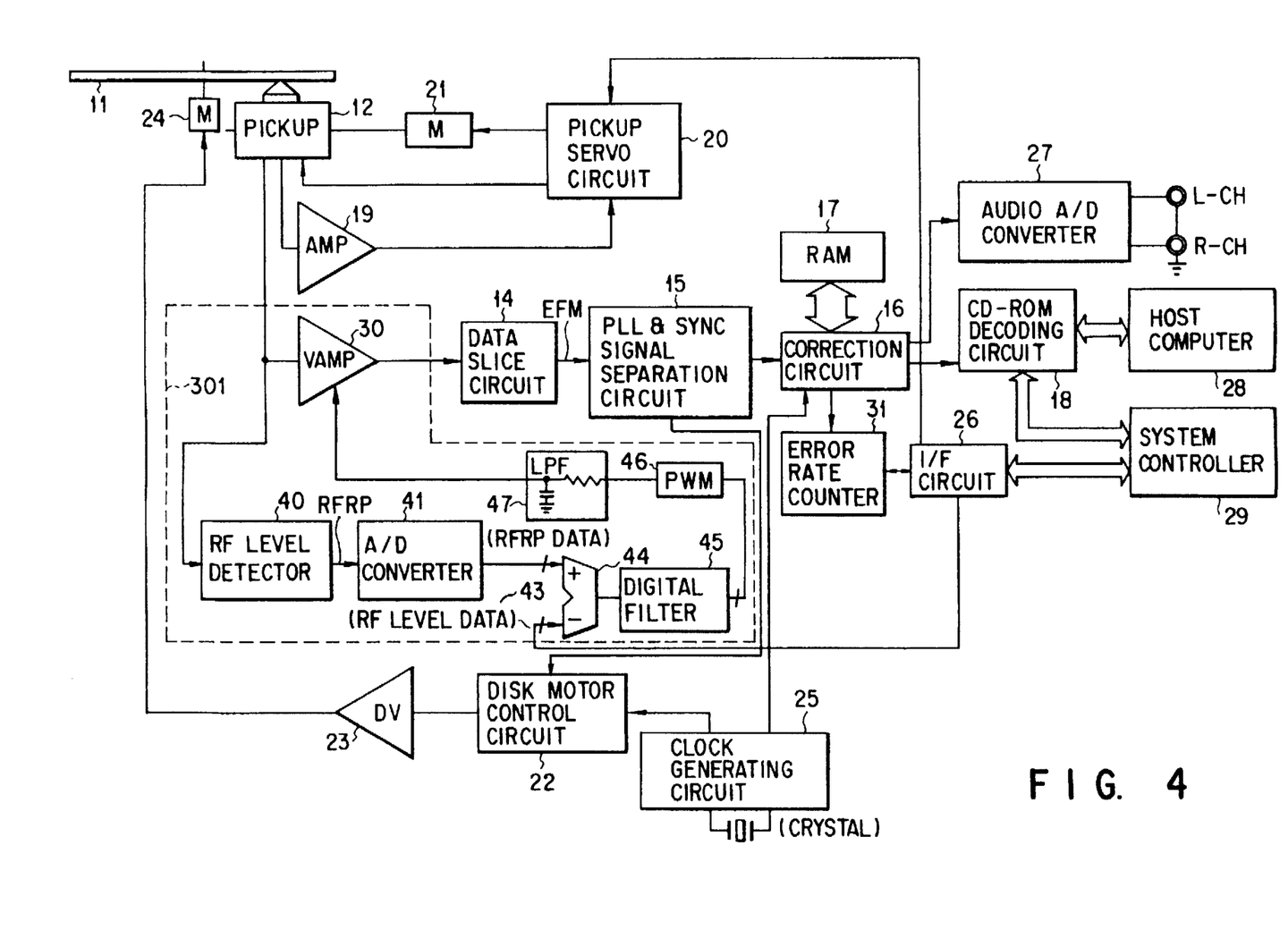
FIG. 4 is a block diagram showing a CD-ROM system (reproducing mechanism) for an optical disk reproducing apparatus according to the second embodiment of the present invention.

FIG. 4 is a block diagram showing a CD-ROM system (reproducing mechanism) for an optical disk reproducing apparatus according to the second embodiment of the present invention. Unlike the system shown in FIG. 3, the AGC function is added with respect to the RF signal (reproduction signal). That is, this system differs from the one shown in FIG. 3 in that an AGC circuit 301 is formed, and a variable gain amplifier 30 is controlled by a control mechanism based on AGC. This portion will be described below.

A reproduction signal from a pickup 12 is input to the variable gain amplifier 30 and an RF level detector 40. The RF level detector 40 generates an RFRP signal indicating the amplitude (ripple) of the RF signal. The RFRP signal is converted into digital data (RFRP data) by an A/D converter 41. A subtracter 44 receives the RFRP data and RF level data as an adjustment target, and calculates the difference value between these data. In this case, the RF level data is a reference level sequentially determined by a system controller 29 in accordance with the result obtained by an error rate counter 31.

The difference value from the subtracter 44 is sent to a digital filter 45. In this filter, RF noise components are removed from the data of the difference value, and the resultant data is input to a PWM circuit 46. An analog low-pass filter 47 removes the carrier component from an output signal from the PWM circuit 46. The resultant signal controls the variable gain amplifier 30.

According to the above arrangement, the AGC circuit 301 operates to match the input level of a signal from the variable gain amplifier 30 with reference RF level data. That is, the CD-ROM system (reproducing mechanism) having the above arrangement may be regarded as a feedforward type adjustment system.

Figure 5:
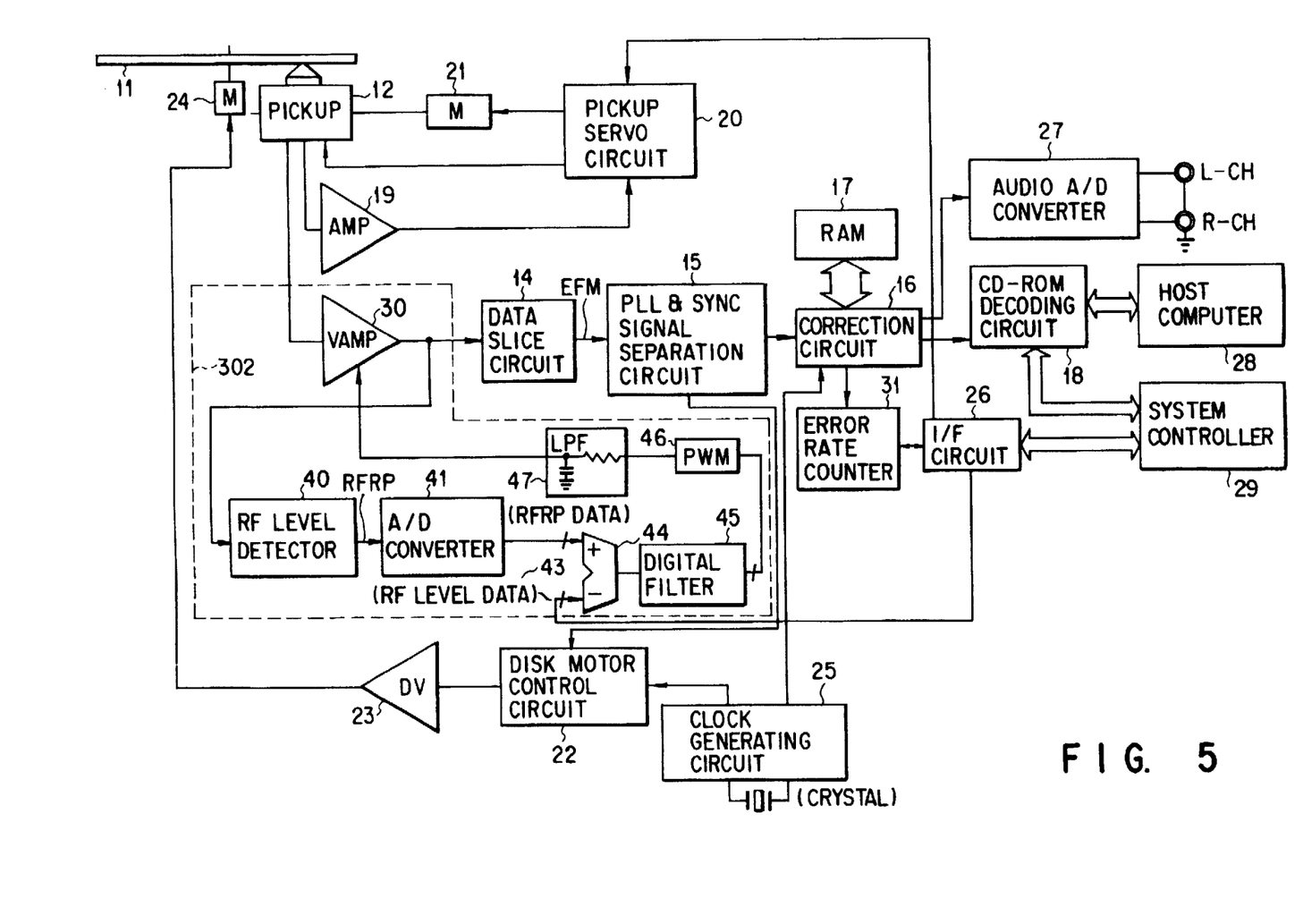
FIG. 5 is a block diagram showing a CD-ROM system (reproducing mechanism) for an optical disk reproducing apparatus according to the third embodiment of the present invention.

FIG. 5 is a block diagram showing a CD-ROM system (reproducing mechanism) for an optical disk reproducing apparatus according to the third embodiment of the present invention. Similar to the system shown in FIG. 4, the AGC function (AGC circuit 302) is added with respect to the RF signal. The system shown in FIG. 5 differs from the one shown in FIG. 4 in that the signal input to an RF level detector 40 is the output from a variable gain amplifier 30. In this embodiment, the AGC circuit 302 operates to match the amplitude of the output from the variable gain amplifier 30 with reference RF level data. That is, the CD-ROM system (reproducing mechanism) having the arrangement according to the third embodiment is regarded as a feedback type adjustment system.

Similar to the arrangement shown in FIG. 4, in the arrangement shown in FIG. 5, an error rate counter 31 counts correction result flags obtained by a correction circuit 16, and a system controller 29 monitors the count value through an I/F circuit 26. Assume that the system controller 29 monitors the count value of compensation flags, and corresponding data is generated. In this case, similar to the control operation in FIG. 3 or 4, the reference RF level data is changed to increase the amplitude of the RF signal, i.e., the gain of the variable gain amplifier 30. With this operation, control is performed to inhibit generation of a compensation flag.

As another determination method for the error rate counter 31, a method which is dependent on only the count result of C1 correction flags may be used. When the count result of C1 correction flags indicates that the error rate of the RF signal falls outside the range in which data can be satisfactorily read, the system controller 29 changes the RF level data to increase the gain of the variable gain amplifier 30, thereby making the error data after C1 correction processing fall within the allowable range.

As compared with the arrangement shown in FIG. 3, the arrangements shown in FIGS. 4 and 5 also allow amplitude adjustment and the like of the RF signal with a change in the quality of the pickup over time, and hence are more practical in terms of performance.

Figure 6:
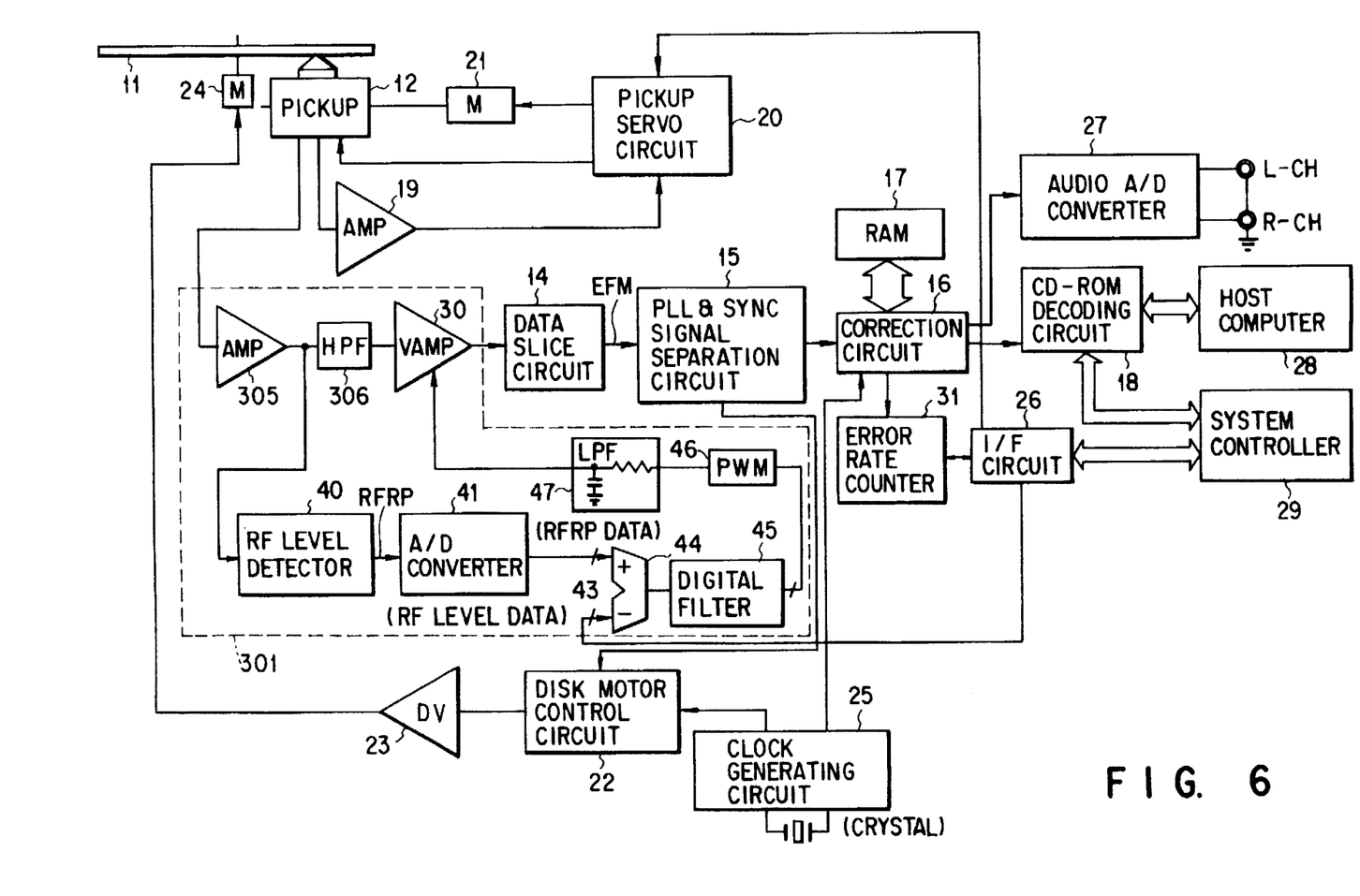
FIG. 6 is a block diagram showing a CD-ROM system (reproducing mechanism) for an optical disk reproducing apparatus according to the fourth embodiment of the present invention.

FIG. 6 is a block diagram showing a CD-ROM system (reproducing mechanism) for an optical disk reproducing apparatus according to the fourth embodiment of the present invention. This system has a feedforward type AGC function similar to the one shown in FIG. 4. This arrangement differs from the one shown in FIG. 4 in that a fixed gain amplifier 305 and a high-pass filter (HPF) 306 are arranged along the route from a pickup 12 to a variable gain amplifier 30. A reproduction signal from the pickup 12 is subjected to waveform equalization in the fixed gain amplifier 305. The high-pass filter 306 then removes amplified DC components from the reproduction signal. The resultant signal is input to the variable gain amplifier 30 having an AGC arrangement.

Figure 7:
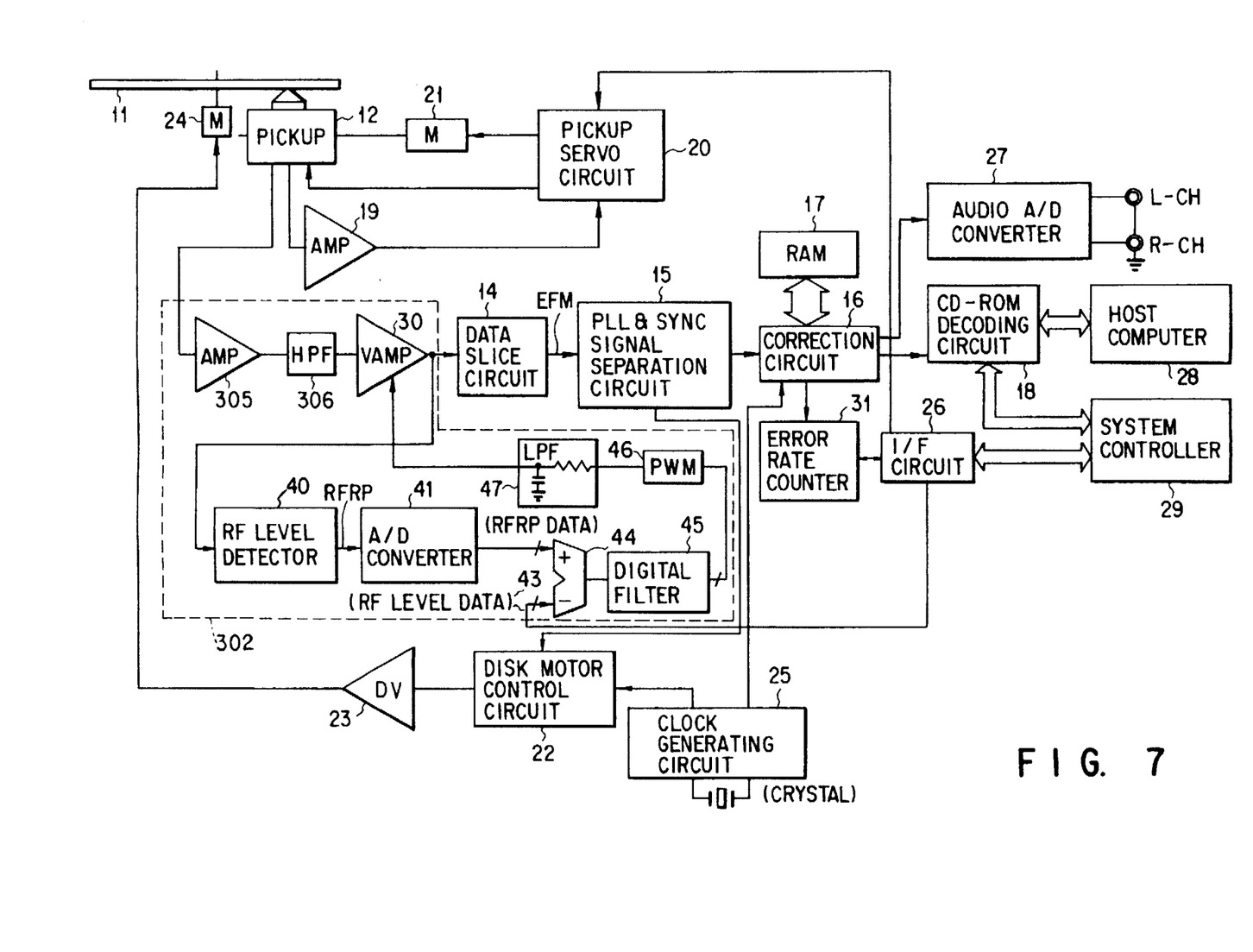
FIG. 7 is a block diagram showing a CD-ROM system (reproducing mechanism) for an optical disk reproducing apparatus according to the fifth embodiment of the present invention.

FIG. 7 is a block diagram showing a CD-ROM system (reproducing mechanism) for an optical disk reproducing apparatus according to the fifth embodiment of the present invention. This system has a feedback type AGC function similar to the one shown in FIG. 5. This arrangement differs from the one shown in FIG. 5 in that a fixed gain amplifier 305 and a high-pass filter (HPF) 306 are arranged along the route from a pickup 12 to a variable gain amplifier 30. A reproduction signal from the pickup 12 is subjected to waveform equalization in the fixed gain amplifier 305. The high-pass filter (HPF) 306 removes amplified DC components from the reproduction signal. The resultant signal is input to the variable gain amplifier 30.

The arrangements shown in FIGS. 6 and 7 are effective for a disk on which a signal with a low degree of modulation and a small AC component is recorded and which has a high reflectance and produces a large DC component. More specifically, these arrangements eliminate the possibility that as the amplitude of the AC component of a signal read from such a disk increases, the DC component is also amplified, and the amplitude output of the AC component exceeds the capacity of the amplifier to reach saturation. That is, the filter 306 for cutting off the DC component is arranged between the two amplifiers 305 and 30 to allow sufficient amplitude adjustment of only the AC component. In addition, since the fixed gain amplifier 305 is connected to the input terminal of the filter 306, a fixed gain output from the amplifier 305 can be sent to an RF level detector 40. Therefore, variations in amplitude with changes in the quality of the optical pickup over time can be easily detected.

Figure 8:
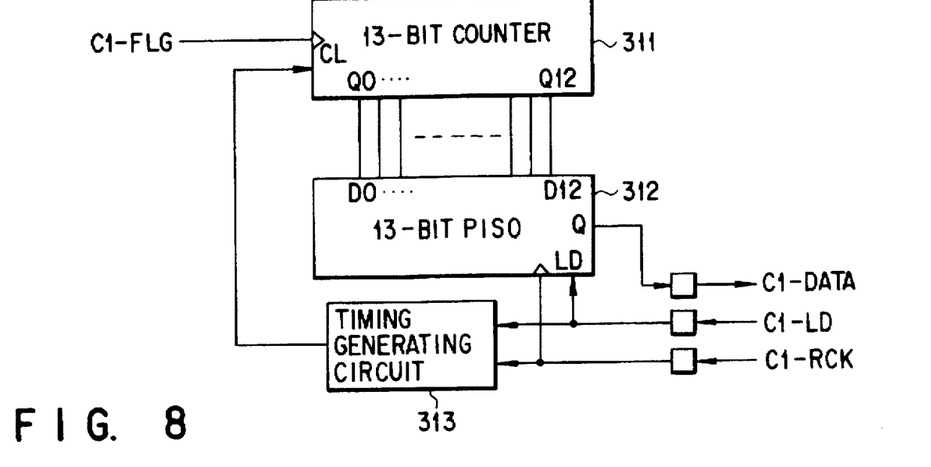
FIG. 8 is a first circuit diagram showing the detailed arrangement of an error counter in each of the above embodiments.
Figure 9:
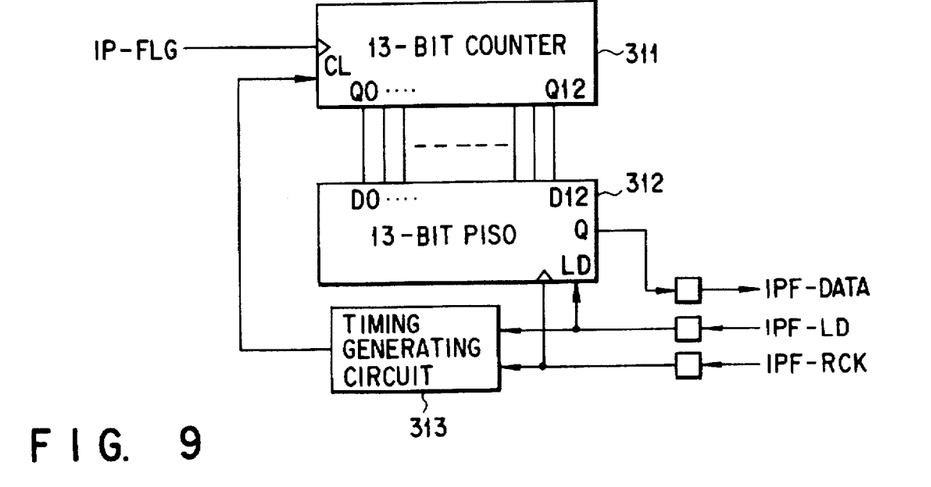
FIG. 9 is a second circuit diagram showing the detailed arrangement of an error counter in each of the above embodiments.
Figure 10:
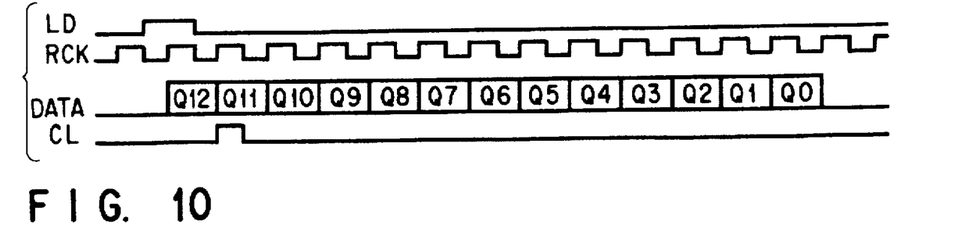
FIG. 10 is a common timing chart showing the operation of each of the circuits shown in FIGS. 8 and 9.

FIGS. 8 and 9 are circuit blocks showing examples of the detailed arrangement of the error rate counter 31 in each embodiment described above. FIG. 10 is a common timing chart showing both the operations of the circuits in FIGS. 8 and 9. The circuit in FIG. 8 counts and outputs C1 correction flags (C1-FLGs) obtained from the correction circuit 16 in the CD correction system. The circuit in FIG. 9 counts and outputs C2 correction flags (IP-FLGs) obtained from the correction circuit 16. The circuits in FIGS. 8 and 9 have the same arrangement except that input and output signals are indicated by "C1" and "IP".

The circuit in FIG. 8 will be exemplified. This circuit is constituted by a counter 311 for counting C1 correction flags (C1-FLGs), and a PISO (Parallel In Serial Out) circuit 312 for outputting the count data to an external controller (the system controller 29 using the I/F circuit in FIG. 1 or the like) through a PISO. Each of the circuits 311 and 312 is designed to handle a 13-bit signal.

A system controller 29 in each embodiment described above supplies a read clock C1-RCK and a load signal C1-LD to a timing generating circuit 313 through an I/F circuit 26. The timing generating circuit 313 supplies a clear signal CL to the counter 311. When the PISO circuit 312 receives pulses of the load signal C1-LD, C1 correction flag count data Q0 to Q12 (C1-DATA) are serially read out from the PISO circuit 312 in synchronism with the clock C1-RCK.

The signals C1-LD, C1-RCK, C1-DATA, and CL in FIG. 8 are respectively replaced with signals IPF-LD, IPF-RCK, IPF-DATA, and CL in FIG. 9. The timings of the respective signals are represented by LD, RCK, DATA, and CL in FIG. 10. In response to the data Q11, the timing generating circuit 313 supplies the clear signal CL to the counter 311.

The data unit in the CD system is one frame, which is constituted by 32 symbols (1 symbol=8 bits). There are 7,350 frames per second (normal speed). The correction signal in the CD system generates one pulse as a C1 correction flag if at least one C1 error is present in one frame. The maximum count of these flags for one second is 7,350. That is, in order to count flags for one second, "1CB6 (hex)" in hexadecimal notation, i.e., 13 bits in binary notation, are required. In addition, compensation flags are generated when C1 correction and C2 correction cannot be performed, as described above.

The error rate quality of data received by a correction circuit 16 can be determined on the basis of C1 correction flag count data. The error correction processing state of data transferred to the CD-ROM decoding circuit 18 can be determined on the basis of compensation flag (or C2 correction flag) count data.

The count data read cycle need not be one second, and may be a predetermined time period dependent on the reproduction speed or an arbitrary predetermined fixed-length time period. As count data are accumulated for a long period of time, the reproduction state at each time can be detected more accurately because instantaneous influences can be reduced.

Assume that the count data read cycle is set to one sub-code frame. In this case, one sub-code frame consists of 98 frames, and this one sub-code corresponds to the read cycle. One sub-code corresponds to 13.3 (msec) (=98 frames÷7.35 kHz) at normal speed, and hence 13.3÷N (msec) at N-fold speed. The maximum count value is therefore "98" ("62 (hex)" in hexadecimal notation). The advantage in setting the read cycle to one sub-code frame is that the system controller must read sub-codes without fail in terms of system operation. That is, since the error rate is read at the same time when a sub-code is read, this system need not have any timer for independently measuring the read cycle.

If it is determined in accordance with this count data that the error rate information exceeds a predetermined value, it is determined that the reproduction state is not preferable. The system controller 29 then performs control to increase the amplitude of the RF signal, thus decreasing the error rate to the predetermined error rate or lower.

In the above case, the error rate counter 31 supplies a clock RCK read out by the system controller 29, and reads out serial data. It suffices if this read processing is completed before the next data is read out. This read processing may be performed at the maximum speed at which the system controller can operate.

Figure 11:
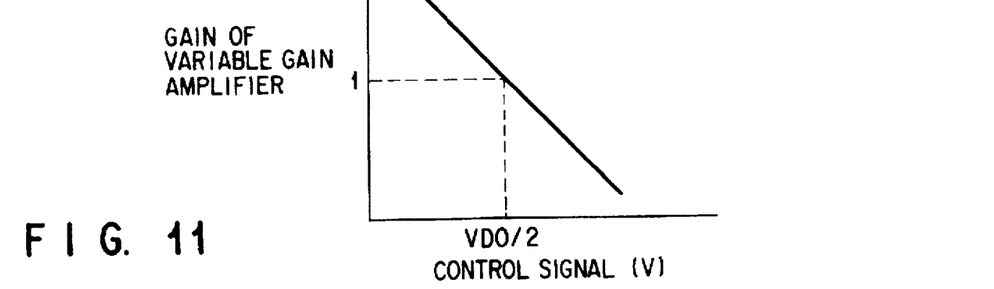
FIG. 11 is a graph showing the gain characteristic of a variable gain amplifier with respect to a control signal which is supplied from a system controller to a variable gain amplifier through an I/F circuit in FIG. 3.

FIG. 11 is a graph showing the gain characteristic of the variable gain amplifier 30 with respect to the control signal supplied from the system controller 29 to the variable gain amplifier 30 through the I/F circuit 26 in FIG. 3. The middle voltage (VDD/2) of the control signal corresponds to a gain of 1. The gain of the amplifier 30 linearly changes with respect to the control signal.

Figure 12:
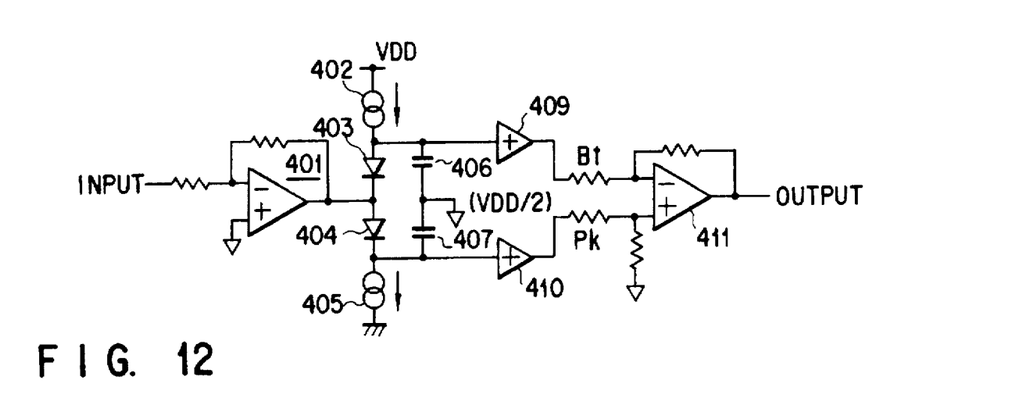
FIG. 12 is a circuit diagram showing the detailed arrangement of an RF level detector in each of the arrangements shown in FIGS. 4 to 7.

FIG. 12 is a circuit diagram showing the detailed arrangement of an RF level detector 40 in each of the arrangements shown in FIGS. 4 to 7. An RF input signal (reproduction signal) INPUT is supplied to the connection node between diodes 403 and 404. A current source 402, the diodes 403 and 404, and a current source 405 are connected in series between a power supply VDD and the ground potential through an inverting amplifier 401. A capacitor 406 is connected between the connection node between the current source 402 and the diode 403 and a reference potential (VDD/2) to detect the lower peak of the input signal and obtain a signal Bt. A capacitor 407 is connected between the connection node between the diode 404 and the reference potential (VDD/2) to detect the upper peak of the input signal and obtain a signal Pk. The signals Bt and Pk are respectively buffered by noninverting amplifiers 409 and 410 each having a voltage follower arrangement, and the difference value between the signals Pk and Bt is calculated by a differential amplifier 411. The resultant data is output from "OUTPUT".

Figure 13:
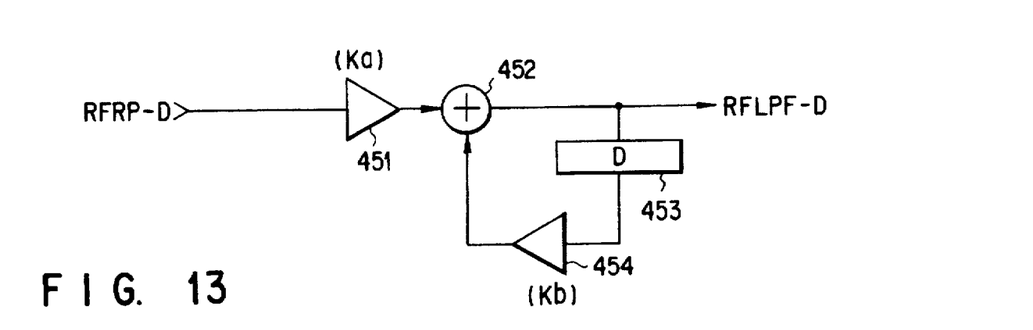
FIG. 13 is a circuit diagram showing the arrangement of a digital filter in each of the arrangements shown in FIGS. 4 to 7.

FIG. 13 is a circuit diagram showing the arrangement of a digital filter 45 in each of the arrangements shown in FIGS. 4 to 7. This filter is an IIR (Infinite-duration Impulse-response) type digital filter. Input data RFRP-D is input to an adder 452 through a multiplier 451 having a coefficient Ka. A signal obtained by delaying the output from the adder 452 by a time period corresponding to one sampling operation by a delay circuit 453 and passing the resultant signal through a multiplier 454 having a coefficient Kb is added to the input data by the adder 452. Output data RELPF-D is a signal obtained by removing RF noise from an error signal (a signal for controlling the variable gain amplifier 30) for changing the level of a signal RFRP.

Figure 14:
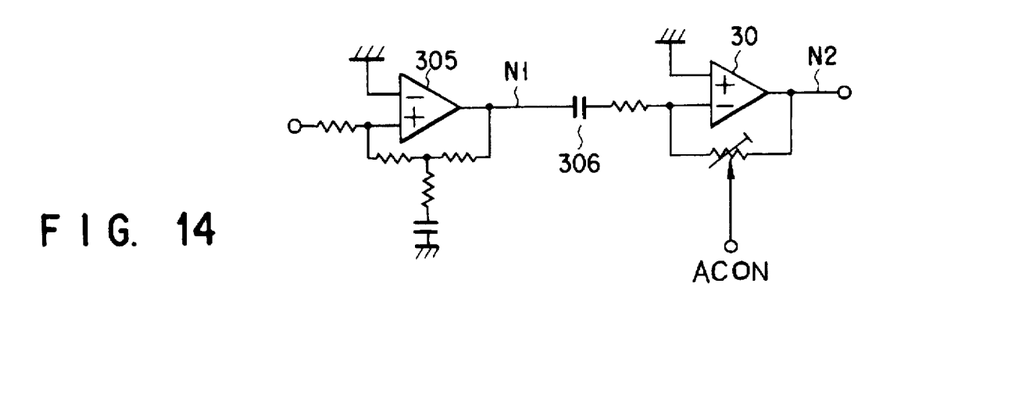
FIG. 14 is a circuit diagram showing a fixed gain amplifier, a high-pass filter, and a variable gain amplifier in each of the arrangements shown in FIGS. 6 and 7.

FIG. 14 is a circuit diagram showing the fixed gain amplifier 305, the high-pass filter 306, and the variable gain amplifier 30 in each of the arrangements shown in FIGS. 6 and 7. The fixed gain amplifier 305 has frequency characteristics for waveform equalization. The high-pass filter (HPF) 306 is realized by inserting a capacitor between the fixed gain amplifier 305 and the variable gain amplifier 30 on the output terminal side of the fixed gain amplifier 305. If the above arrangement is to operate such that the level of an output node N1 of the fixed gain amplifier 305 is detected to realize an AGC circuit so as to determine an adjustment signal ACON for the variable gain amplifier 30, the arrangement can be regarded as the feedforward type shown in FIG. 6. If the above arrangement is to operate such that the level of an output node N2 of the variable gain amplifier 30 is detected to realize an AGC circuit so as to determine the adjustment signal ACON for the variable gain amplifier 30, the arrangement can be regarded as the feedback type shown in FIG. 7.

Figure 15:
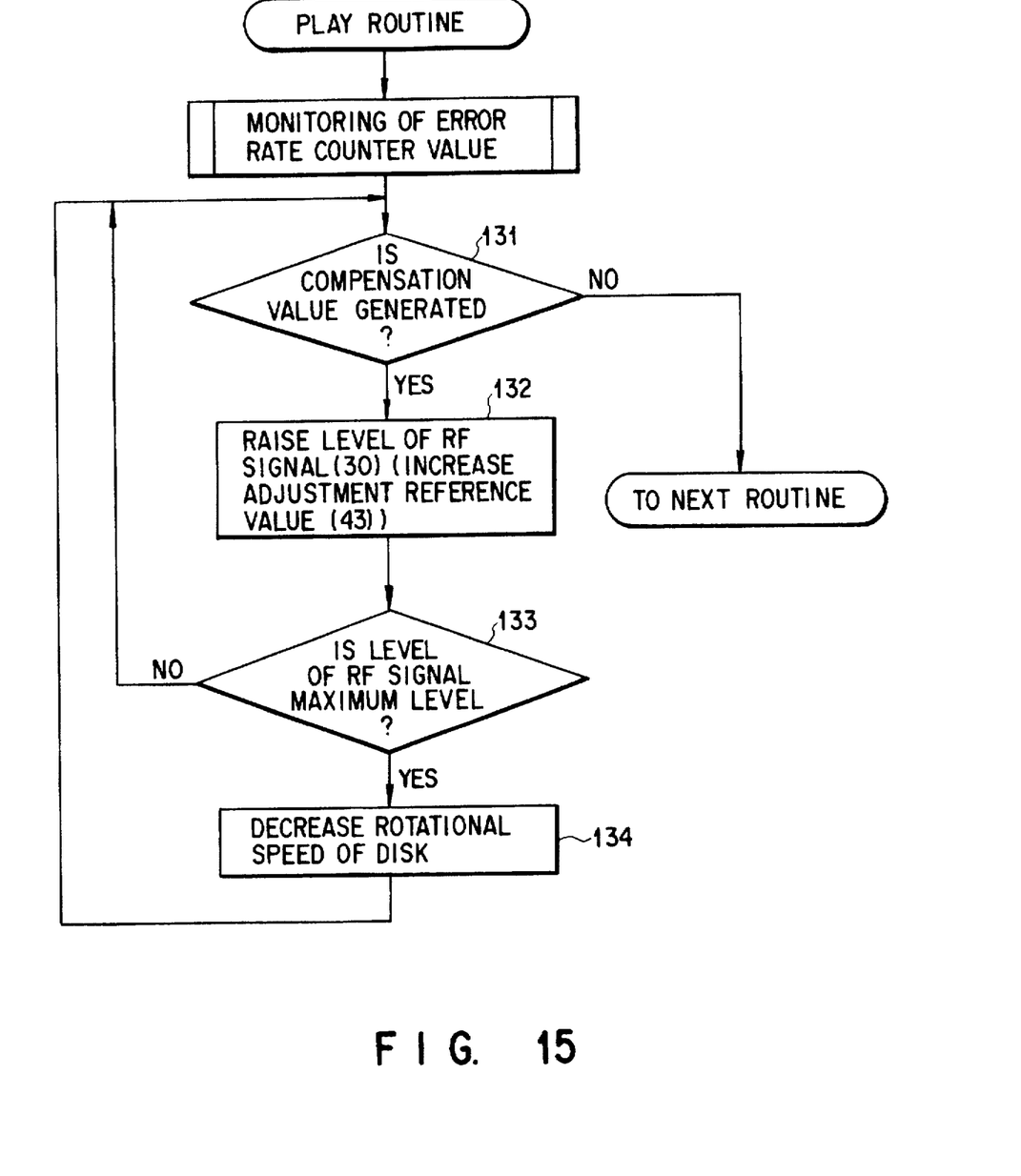
FIG. 15 is a flow chart associated with a disk reproducing system applied to a system controller in each of the arrangements shown in FIGS. 3 to 7.

FIG. 15 is a flow chart associated with a disk reproducing system applied to the system controller 29 in each of the arrangements shown in FIGS. 3 to 7. In the reproduction mode, the compensation flag count value or C1 correction flag count value of the error rate counter 31 is monitored to determine the presence/absence of a compensation value (step 131). In this case, the compensation value is a count value larger than a given allowable compensation flag count value or C1 correction flag count value.

If the above compensation value is not generated, i.e., the compensation flag count value is "0", or the C1 correction flag count value falls within the allowable range, the flow advances to the next step. If a compensation flag is generated, i.e., the compensation flag count value is not "0", or the C1 correction flag count value exceeds the allowable range, adjustment is performed to raise the amplitude level of the RF signal (step 132). In this case, since the amplitude level of the RF signal cannot be raised infinitely, the amplitude of the RF signal is determined depending on whether the maximum gain control is imposed on the variable gain amplifier 30 (step 133). If the amplitude of the RF signal is not raised to the maximum level, the presence/absence of a compensation value is checked again. If no compensation value is generated, the flow shifts to the next routine. If this condition is not satisfied, the step of raising the RF amplitude gain (step 132) and the step of checking the level of the RF signal (step 133) are repeatedly performed.

When a compensation value is generated even after the RF amplitude is maximized (the gain of the variable gain amplifier 30 and the RF level as an adjustment reference level are maximized), the step of decreasing the rotational speed of the disk (step 134), which is performed in the conventional system, is performed for the first time. After this routine for decreasing the rotational speed of the disk, the above processing is repeated again.

The processing shown in FIG. 15 may be constantly repeated in the reproduction mode. Alternatively, this processing may be performed at predetermined intervals (relatively long time) determined by the system controller 29, or may be performed only in the initial period after a disk replacing operation.

C1 correction flags allow determination of the reproduction state of a disk which cannot be determined on the basis of only compensation flags. Such determination processing can be effectively performed if the system controller 29 has a predetermined upper limit, and raises the amplitude level of the RF signal when the C1 correction count exceeds the upper limit until the count falls within the allowable range below the upper limit. The compensation flag indicates the correction limit of the correction circuit 16. When errors occur in excess of this correction limit, it can be determined for the first time that a data read operation cannot be performed. If this flag is generated, the disk ceases to function as a CD-ROM, and the flow of processing must shift to a processing routine requiring much time, such as restarting seek processing or RF signal adjustment. If, however, C1 correction flags are monitored to determine the reproduction state, reproduction immediately below the correction limit and the like can be avoided. This saves an unnecessary time taken to restart seek processing, RF signal adjustment, or the like. With the application of the present invention, a reproduction state with a larger margin can be realized for each disk.

As has been described above, according to the present invention, a system capable of obtaining an optimal error rate for each disk can be formed, and data can be read from each disk at a maximum allowable rotational speed with an optimal error rate, thereby providing an optical disk reproducing apparatus which can realize a stable, high-speed CD-ROM drive.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An optical disk reproducing apparatus having a system for demodulating a reproduction signal read by pickup means from a medium on which digital data is recorded, comprising:

a variable gain amplifier for amplifying an amplitude of the reproduction signal from said pickup means in accordance with a control signal;

correction processing means for generating a data signal by binarizing an output signal from said variable gain amplifier, extracting a clock synchronous with the data signal, and performing demodulation and error correction processing of a data signal to generate a signal corresponding to the correction result; and system control means for adjusting a gain of said variable gain amplifier by obtaining the control signal in accordance with the signal corresponding to the correction result obtained by said correction processing means.

2. An apparatus according to claim 1, wherein the signal corresponding to the correction result obtained by said correction processing means is a correction result flag, and said system control means includes correction result flag measuring means for cumulatively measuring the correction result flag for a predetermined period of time, and generates the control signal in accordance with the measurement result obtained by said correction result flag measuring means.

3. An apparatus according to claim 2, wherein said system control means includes an AGC circuit for setting a signal which changes in accordance with the measurement result obtained by said correction result flag measuring means as a reference signal level, and generating the control signal for said variable gain amplifier by using the reference signal level.

4. An apparatus according to claim 2, wherein said correction result flag measuring means includes a feedforward type AGC circuit for generating a reference signal level in accordance with the measurement result obtained by said correction result flag measuring means, and generating the control signal for said variable gain amplifier in accordance with a difference between an input signal level of said variable gain amplifier and the reference signal level.

5. An apparatus according to claim 4, further comprising:
a fixed gain amplifier which is arranged on an input stage of said variable gain amplifier and receives the reproduction signal from said pickup means; and
a high-pass filter arranged along a route between an output of said fixed gain amplifier and an input of said variable gain amplifier.

6. An apparatus according to claim 2, wherein said system control means includes a feedback type AGC circuit for generating a reference signal level in accordance with the measurement result obtained by said correction result flag measuring means, and generating the control signal for said variable gain amplifier to match an output signal level of said variable gain amplifier with the reference signal level.

7. An apparatus according to claim 6, further comprising:
a fixed gain amplifier which is arranged on an input stage of said variable gain amplifier and receives the reproduction signal from said pickup means; and
a high-pass filter arranged along a route between an output of said fixed gain amplifier and an input of said variable gain amplifier.

8. An optical disk reproducing apparatus comprising:
pickup means for obtaining a reproduction signal from a medium on which digital data is recorded;
a variable gain amplifier for amplifying an amplitude of the reproduction signal from said pickup means in accordance with a control signal;
correction processing means for generating a data signal by binarizing an output signal from said variable gain amplifier, extracting a clock synchronous with the data signal, and performing demodulation and error correction processing of the data signal to generate a signal corresponding to a correction result; and system control means for controlling said variable gain amplifier by obtaining the control signal in accordance with the signal corresponding to the correction result obtained by said correction processing means.

9. An optical disk reproducing apparatus comprising:
pickup means for obtaining a reproduction signal from a medium on which digital data is recorded;
a variable gain amplifier for amplifying an amplitude of the reproduction signal from said pickup means in accordance with a control signal;
correction processing means for generating a data signal by binarizing an output signal from said variable gain amplifier, extracting a clock synchronous with the data signal, and performing demodulation and error correction processing of the data signal to generate a correction result flag;
correction result flag measuring means for cumulatively measuring correction result flags generated by said correction processing means for a predetermined period of time; and
system control means for controlling said variable gain amplifier by generating the control signal in accordance with the measurement result obtained by said correction result flag measuring means.

10. An apparatus according to claim 9, wherein said system control means includes an AGC circuit for setting a signal which changes in accordance with the measurement result obtained by said correction result flag measuring means as a reference signal level, and generating the control signal for said variable gain amplifier by using the reference signal level.

11. An optical disk reproducing apparatus comprising:
pickup means for obtaining a reproduction signal from a medium on which digital data is recorded;
a variable gain amplifier for amplifying an amplitude of the reproduction signal from said pickup means in accordance with a control signal;
correction processing means for generating a data signal by binarizing an output signal from said variable gain amplifier, extracting a clock synchronous with the data signal, and performing demodulation and error correction processing of the data signal to generate a correction result flag;
correction result flag measuring means for cumulatively measuring correction result flags generated by said correction processing means for a predetermined period of time;
signal setting means for generating a reference signal level for adjusting a gain of said variable gain amplifier in accordance with the measurement result obtained by said correction result flag measuring means; and
a feedforward type AGC circuit for controlling said variable gain amplifier by generating the control signal in accordance with a difference between an input signal level of said variable gain amplifier and the reference signal level generated by said signal setting means.

12. An apparatus according to claim 11, further comprising:
a fixed gain amplifier which is arranged on an input stage of said variable gain amplifier and receives the reproduction signal from said pickup means; and
a high-pass filter arranged along a route between an output of said fixed gain amplifier and an input of said variable gain amplifier.

13. An optical disk reproducing apparatus comprising:

pickup means for obtaining a reproduction signal from a medium on which digital data is recorded;

a variable gain amplifier for amplifying an amplitude of the reproduction signal from said pickup means in accordance with a control signal;

correction processing means for generating a data signal by binarizing an output signal from said variable gain amplifier, extracting a clock synchronous with the data signal, and performing demodulation and error correction processing of the data signal to generate a correction result flag;

correction result flag measuring means for cumulatively measuring correction result flags generated by said correction processing means for a predetermined period of time;

signal setting means for generating a reference signal level for adjusting a gain of said variable gain amplifier in accordance with the measurement result obtained by said correction result flag measuring means; and a feedback type AGC circuit for controlling said variable gain amplifier by generating the control signal to match an output signal level of said variable gain amplifier with the reference signal level generated by said signal setting means.

14. An apparatus according to claim 13, further comprising:

a fixed gain amplifier which is arranged on an input stage of said variable gain amplifier and receives the reproduction signal from said pickup means; and a high-pass filter arranged along a route between an output of said fixed gain amplifier and an input of said variable gain amplifier.

* * * * *